United States Patent
Lee et al.

(10) Patent No.: US 8,734,977 B2
(45) Date of Patent: May 27, 2014

(54) BATTERY MODULE

(75) Inventors: Gun-Goo Lee, Yongin-si (KR);
Tae-Yong Kim, Yongin-si (KR);
Hong-Sup Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1899 days.

(21) Appl. No.: 11/388,877

(22) Filed: Mar. 23, 2006

(65) Prior Publication Data

US 2006/0216583 A1    Sep. 28, 2006

(30) Foreign Application Priority Data

Mar. 25, 2005  (KR) .................. 10-2005-0024871
Jul. 29, 2005  (KR) .................. 10-2005-0069487

(51) Int. Cl.
*H01M 10/50* (2006.01)
*H01M 10/00* (2006.01)

(52) U.S. Cl.
USPC ........................................ 429/120; 429/122

(58) Field of Classification Search
CPC ............ H01M 10/50; H01M 10/5034; H01M 10/5046; H01M 10/5044; H01M 10/5061
USPC ................................. 429/122, 120
See application file for complete search history.

(56) References Cited

U.S. PATENT DOCUMENTS

| 6,340,877 B1 * | 1/2002 | Mita et al. .............. 320/112 |
| 2003/0064283 A1 | 4/2003 | Uemoto et al. |
| 2004/0064283 A1 | 4/2004 | Preiksas et al. |
| 2004/0163398 A1 | 8/2004 | Morishita et al. |

FOREIGN PATENT DOCUMENTS

| CN | 2627660 Y | 7/2004 | |
| JP | 08-148189 | 6/1996 | |
| JP | 08-273706 | 10/1996 | |
| JP | 09-266016 | * 7/1997 | ............ H01M 10/50 |
| JP | 10-106521 | 4/1998 | |
| JP | 11-329514 | 11/1999 | |
| JP | 2000-268791 | 9/2000 | |
| JP | 2001-143769 | 5/2001 | |

OTHER PUBLICATIONS

European Search Report dated May 29, 2006 for European Application 06111583.8 in the name of Samsung SDI Co., Ltd., corresponding to the subject application.
Japanese Office action issued Oct. 6, 2009 in corresponding Japanese patent application No. 2006-085962.

* cited by examiner

*Primary Examiner* — Helen O Conley
(74) *Attorney, Agent, or Firm* — Christie, Parker & Hale, LLP (57) ABSTRACT

A battery module includes a cooling tube through which cooling air passes, a unit battery installed on the cooling tube, and a temperature adjusting unit installed on the cooling tube to adjust a temperature of the unit battery.

23 Claims, 14 Drawing Sheets

BATTERY MODULE

CROSS-REFERENCES TO RELATED APPLICATION

This application claims priority to and the benefit of Korean Patent Application Nos. 10-2005-0024871 filed on Mar. 25, 2005, and 10-2005-0069487 filed on Jul. 29, 2005, both applications filed in the Korean Intellectual Property Office, the entire contents of which are incorporated herein by reference.

BACKGROUND OF THE INVENTION

1. Field of the Invention

The present invention relates to a battery module, and more particularly, to a battery module having a plurality of unit batteries for which cooling efficiency is improved.

2. Description of the Related Art

Unlike a primary battery, a rechargeable battery may be recharged. Low capacity batteries are used for various portable electronic devices such as phones, laptop computers, and camcorders. High capacity batteries are used as the power source for driving motors, such as those for hybrid electric vehicles.

Depending on their external shape, rechargeable batteries may be classified into different types, for example, prismatic and cylindrical batteries. The high capacity rechargeable battery (hereinafter, referred as "battery module") are composed of a plurality of rechargeable batteries (hereinafter, each referred as "unit battery") so that it can be used to drive motors of machines requiring a high power source such as hybrid electric vehicles.

Each of the unit batteries includes an electrode assembly having positive and negative electrodes and a separator interposed between the positive and negative electrodes, a case for receiving the electrode assembly, a cap assembly for sealing the case, and positive and negative terminals extending from the cap assembly and electrically connected to the positive and negative electrodes, respectively.

In the battery module, the unit batteries are spaced apart from each other by a predetermined distance and connected in series or parallel.

Since the battery module is comprised of several to tens of unit batteries, the heat generated from the unit batteries must be efficiently dissipated. The heat dissipation property of the battery module is a very important factor on which the performance of the battery module depends.

When the heat dissipation is not properly realized, a temperature difference between the unit batteries may be generated to deteriorate the charge/discharge efficiency. Furthermore, the temperature of the battery module may increase excessively, thereby deteriorating the performance of the battery module or, in the most severe cases, causing the explosion of the battery module.

Particularly, when the battery module is used as the high capacity rechargeable battery for driving motors of, for example, a vacuum cleaner, an electric scooter, or a hybrid electric vehicle, the charge and discharge is done with a large capacity of current. Thus, the internal temperature of the battery module increases excessively. This deteriorates the inherent performance of the battery module. Therefore, it is very important to efficiently dissipate the excessive heat out of the battery module.

SUMMARY OF THE INVENTION

The present invention provides a battery module having a plurality of unit batteries for which cooling efficiency is maximized.

The present invention further provides a battery module having a plurality of unit batteries that can be equally cooled to minimize a temperature difference between them.

According to one embodiment of the present invention, a battery module includes a cooling tube through which cooling air passes, a unit battery installed on the cooling tube, and a temperature adjusting unit installed on the cooling tube to adjust a temperature of the unit battery.

The temperature-adjusting unit may be a thermoelectric element or a heat dissipation rib.

The unit battery may be installed on an inner surface of the cooling tube and the temperature adjusting unit may be installed on an outer surface of the cooling tube.

Alternatively, the unit battery may be installed on an outer surface of the cooling tube and the temperature adjusting unit may be installed on an inner surface of the cooling tube.

The cooling tube may be cylindrical or prismatic.

The unit battery may be cylindrical or prismatic.

The unit battery may be inserted in an insertion case installed on an outer surface of the cooling tube.

The insertion tube has a section corresponding to a section of the unit battery.

The battery module may further include an outer tube disposed around the cooling tube to define an air channel between them. A heat dissipation rib may be formed on the outer tube.

According to another embodiment of the present invention, a battery module includes a heat transferring body provided with a plurality of fluid passages along which a cooling medium flows and a plurality of unit batteries installed on the heat transferring body.

The unit batteries may be fixedly inserted in mounting grooves formed on the heat transferring body.

The unit batteries may be arranged on opposite surfaces of the heat transferring body.

The cooling medium is cooling water.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

In the following detailed description, certain embodiments of the present invention are shown and described, by way of illustration. As those skilled in the art would recognize, the described embodiments may be modified in various ways, all without departing from the spirit or scope of the present invention. Accordingly, the drawings and description are to be regarded as illustrative in nature, rather than restrictive.

In the following description, although air is exampled as the cooling medium of a battery module, the present invention is not limited to this. For example, water or other fluids may be used as the cooling medium.

Figure 1:
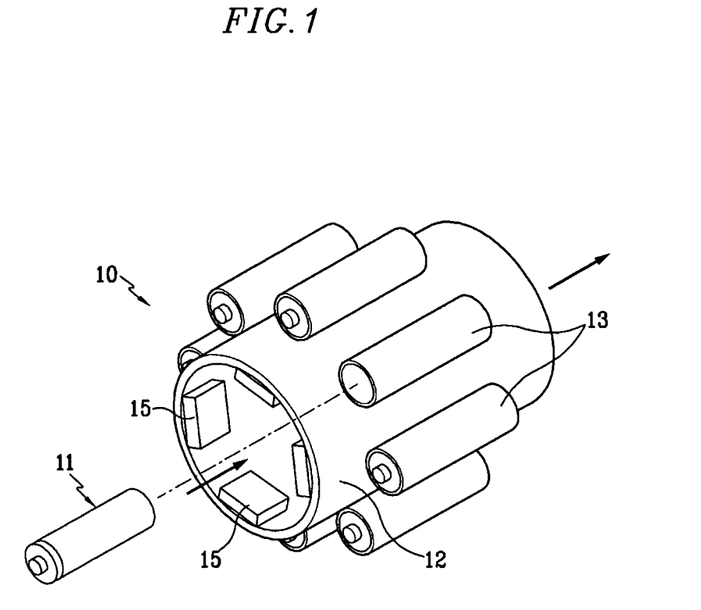
FIG. 1 is a perspective view of a battery module according to an exemplary embodiment of the present invention.

Referring to FIG. 1, a battery module 10 of this embodiment includes a plurality of unit batteries 11 each including an electrode assembly having positive and negative electrodes and a separator interposed between the positive and negative electrodes, a cylindrical cooling tube 12 through which cooling air passes, a plurality of insertion cases 13 arranged on an outer circumference of the cooling tube 12 for receiving the respective unit batteries 11 and spaced apart from each other by a predetermined distance, and a plurality of thermoelectric elements 15 arranged on an inner circumference of the cooling tube 12 and spaced apart from each other by a predetermined distance.

The thermoelectric element 15 is a device for absorbing or discharging heat using different metals or different semiconductors.

In this embodiment, in order to dissipate the heat generated from the unit battery 11, the thermoelectric elements 15 are designed to absorb the heat transferred to the cooling tube 12 and dissipate the absorbed heat through cooling air passing through the cooling tube 12.

However, in some cases, the thermoelectric element may be designed to generate heat.

That is, there may be a case where the temperature of the unit battery 11 must increases in, for example, the coldest season. In this case, the direction of an electric current applied to the thermoelectric elements is converted to generate heat and thus increase the temperature of the unit battery 11, thereby making the unit battery 11 effectively work. In this case, the cooling tube 12 serves as a heat-transferring member.

As described above, the thermoelectric elements function as a temperature-adjusting unit for adjusting the temperature of the unit battery 11. The number of thermoelectric elements may vary according to a size of the battery module. The thermoelectric elements may be installed through a method well known in the art.

As cooling air is forcedly supplied to the cooling tube 12 by, for example, a blower (not shown), the heat generated from the unit batteries 11 is dissipated through the cooling tube 12 by the cooling air.

The thermoelectric element 15 includes a thermostatic electrode (not shown) and a heat absorption/discharge electrode (not shown). The thermostatic electrode contacts the cooling tube 12 while the heat absorption/discharge electrode contacts the air passing through the cooling tube 12. Therefore, when the electric current is applied to the thermoelectric elements, the thermostatic electrode is cooled.

Then, the heat generated from the unit batteries 11 is transferred to and dissipated by the cooling tube 12 and is further dissipated by the cooling air passing through the cooling tube 12.

On the contrary, when the electric current is applied to the thermoelectric elements 15 in an opposite direction to the above case to increase the temperature of the unit batteries 11 using the thermoelectric elements 15, the thermostatic electrodes heat the cooling tube 12 to increase the temperature of the unit batteries 11.

In this embodiment, the unit battery 11 is formed in a cylindrical shape and the insertion case 13 has an inner circumference corresponding to the shape of the unit battery 11. That is, the insertion case 13 is a cylindrical tube having an inner diameter corresponding to an outer diameter of the unit battery 11.

Therefore, when the unit battery 11 is inserted into the insertion case 13, the outer circumference of the unit battery 11 fixedly contacts the inner circumference of the insertion case 13.

At this point, opposite ends (first and second ends) of the insertion case 13 is opened. Therefore, when the unit battery 11 is inserted in the insertion case 13, the positive terminal of the unit battery 11 is exposed through the first end of the insertion case 13 and the negative terminal of the unit battery 11 is exposed through the second end of the insertion case 13 (see FIG. 3).

Therefore, the plurality of unit batteries 11 installed on the cooling tube 12 can be effectively connected in series or parallel.

In this embodiment, the cooling tube 12 and the insertion case 13 may be formed of aluminum or copper that is a relatively high thermal conductive material. In order to break the current between the cooling tube 12 and the insertion case 13, an insulation member (not shown) may be interposed between the cooling tube 12 and the insertion cases 13.

Figure 4:
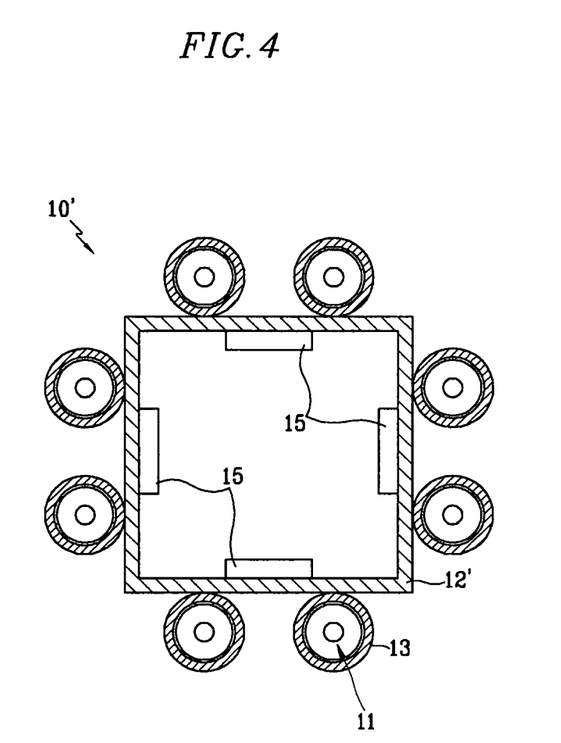
FIG. 4 is a front sectional view of a battery module according to another exemplary embodiment of the present invention.

FIG. 4 shows a battery module according to another embodiment of the present invention.

A battery module of this embodiment is substantially identical to that of FIG. 1 except that a cooling tube 12' is formed having a rectangular section. That is, the cooling tube of the present invention may be formed having a cylindrical or polygonal section. When the cooling tube is formed having the polygonal section, the insertion cases in which the unit batteries are inserted may be mounted on each side of the cooling tube 12'.

Figure 5:
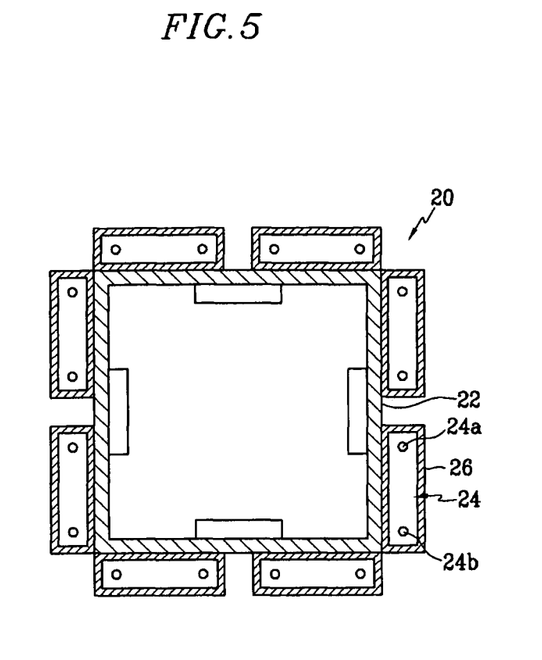
FIG. 5 is a front sectional view of a battery module according to still another exemplary embodiment of the present invention.

FIG. 5 shows a battery module according to another embodiment of the present invention.

A battery module of this embodiment is substantially identical to that of FIG. 4 except that the unit battery is prismatic and an insertion case 26 is formed having a section corresponding to the prismatic battery.

The unit battery 24 is inserted in the insertion case 26 such that a surface having a wider width faces the cooling tube 22. In this case, a contact area between the unit battery 24 and the cooling tube 22 increases, thereby improving the cooling efficiency of the battery module 20.

In the case of the prismatic unit battery, both the positive and negative terminals 24a and 24b are formed on one end thereof. Therefore, only one end of the insertion case 26 may be opened.

Figure 6:
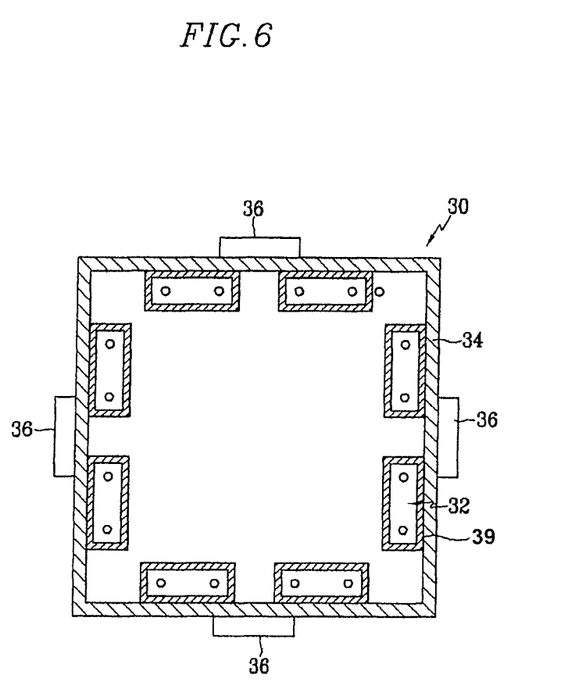
FIG. 6 is a front sectional view of a battery module according to yet another exemplary embodiment of the present invention.

FIG. 6 shows a battery module according to another embodiment of the present invention.

A battery module 30 of this embodiment is identical to that of FIG. 6 except that unit batteries 32 are arranged inside a cooling tube 34 while thermoelectric elements 36 are arranged outside the cooling tube 34.

That is, insertion cases 39 are installed on an inner wall of the cooling tube 34 and the unit batteries 32 are inserted in the respective insertion cases 39.

Therefore, the unit batteries 32 are directly cooled by cooling air passing through the cooling tube 34 and the heat discharged from the unit batteries 32 and transferred through the cooling tube 12 are dissipated to an external side through the thermoelectric elements 36.

Figure 7:
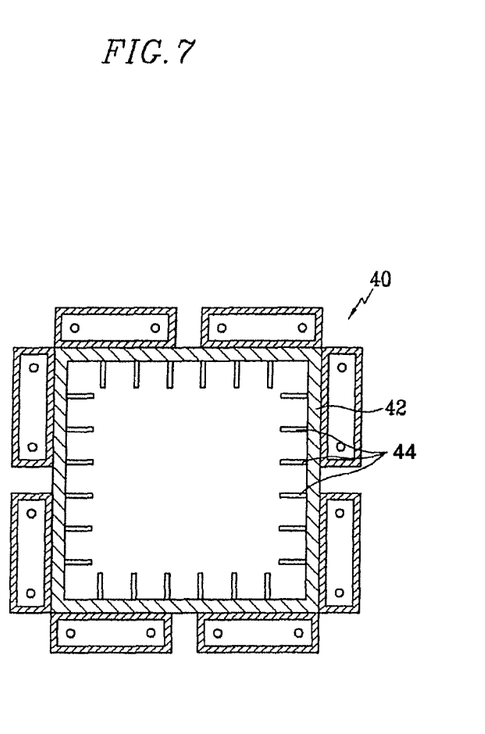
FIG. 7 is a front sectional view of a battery module according to still yet another exemplary embodiment of the present invention.

FIG. 7 shows a battery module according to another embodiment of the present invention.

A battery module of this embodiment is identical to that of FIG. 5 except that the thermoelectric elements of the third embodiment are replaced with heat dissipation ribs 44.

The heat dissipation ribs 44 are arranged on an inner surface of the cooling tube 42 and spaced apart from each other by a predetermined distance. The heat dissipation ribs 44 may extend in a direction where the cooling air flows.

The heat dissipation ribs 44 may be formed of a material identical to that of the cooling tube 42. In this case, the heat dissipation ribs 44 may be simultaneously formed with the cooling tube 42. That is, the heat dissipation ribs 44 can be integrally formed with the cooling tube 42. Alternatively, the heat dissipation ribs 44 may be formed of a material having a thermal conductivity higher than that of the cooling tube 42.

Figure 8:
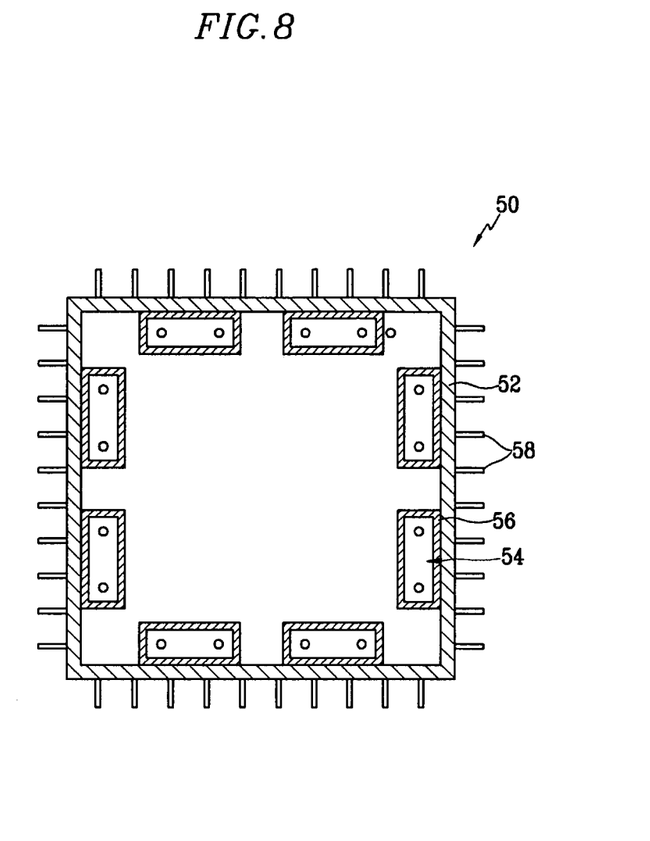
FIG. 8 is a front sectional view of a battery module according to yet another exemplary embodiment of the present invention.

FIG. 8 shows a battery module according to a sixth embodiment of the present invention.

A battery module of this embodiment is identical to that of FIG. 7 except that arranged locations of the heat dissipation ribs are exchanged with arranged locations of the unit batteries.

That is, in this embodiment, insertion cases 56 in which unit batteries 54 are respectively inserted are mounted on an inner surface of the cooling tube 52 and heat dissipation ribs 58 are arranged on an outer surface of the cooling tube 52.

The operation of the battery module of the present invention will now be described with reference to FIGS. 1 and 2.

As described above, the unit batteries 11 are arranged on the cooling tube 12 functioning as a housing. Heat generated from the unit batteries 11 are dissipated by cooling air flowing through the cooling tube 12.

Figure 2:
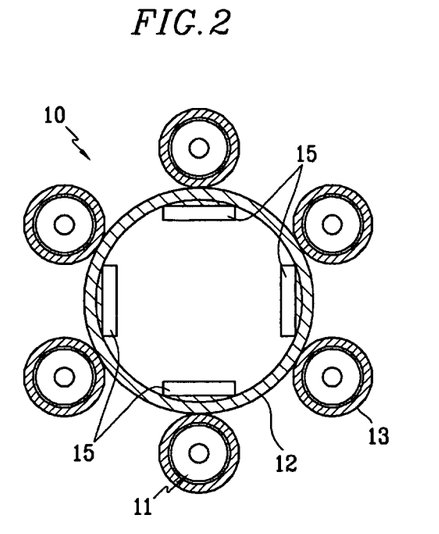
FIG. 2 is a front sectional view of the battery module of FIG. 1.

As shown in FIGS. 1 and 2, the unit batteries 11 are inserted in the respective insertion cases 12 arranged on the outer circumference of the cooling tube 12.

The heat generated from the unit batteries 11 are uniformly dissipated by the cooling air flowing through the cooling tube 12 and the thermoelectric elements installed in the cooling tube 12.

Here, the uniform heat dissipation for the unit batteries 11 is realized as the unit batteries 11 evenly contact the cooling tube 12 such that the heat-exchange between the unit batteries 11 and the cooling air passing through the cooling tube 12 can be done under an identical condition.

That is, contact areas of the unit batteries 11 with the cooling tube 12 are identical to each other. Here, since the cooling tube 12 is disposed at a center of the arrangement of the unit batteries 11, the cooling air passing through the cooling tube 12 uniformly affects on the unit batteries 11.

Therefore, the unit batteries 11 are uniformly cooled under the identical heat dissipation condition.

Figure 9:
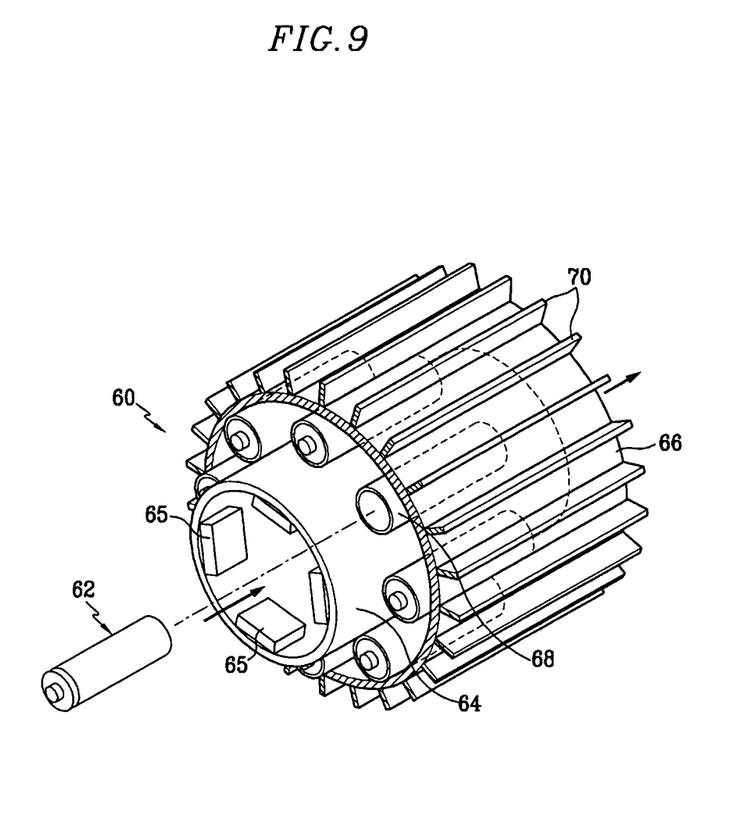
FIG. 9 is a perspective view of a battery module according to still another exemplary embodiment of the present invention.
Figure 10:
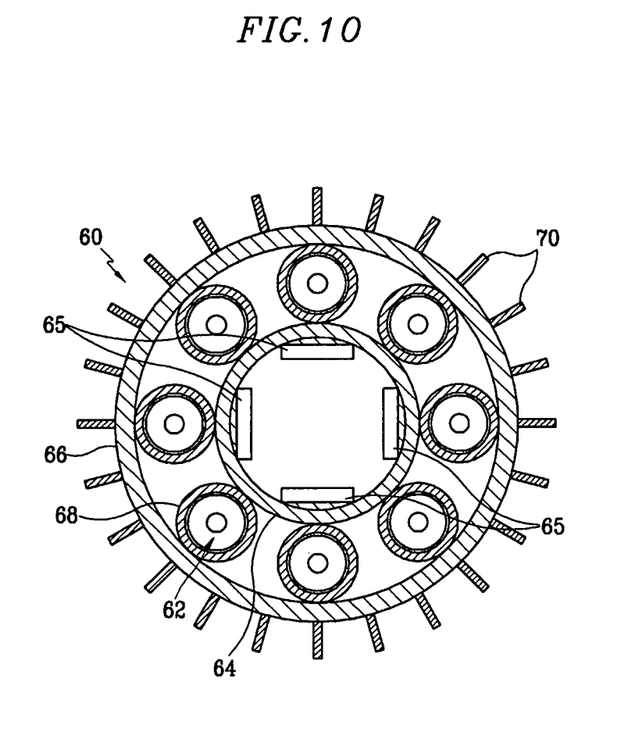
FIG. 10 is a front sectional view of the battery module of FIG. 9.
Figure 11:
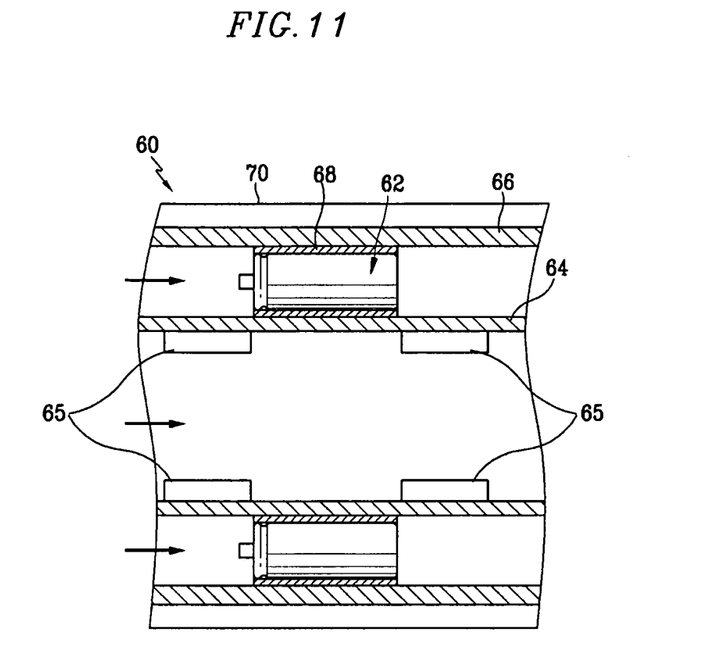
FIG. 11 is a side sectional view of the battery module of FIG. 9.

FIGS. 9 through 11 show a battery module according to another embodiment of the present invention.

Referring to FIGS. 9 through 11, a battery module 60 of this embodiment is identical to that of FIG. 1 except that an outer tube 66 is additionally provided.

Insertion cases 68 in which unit batteries 62 are respectively inserted are disposed between the cooling tube 64 and the outer tube 66 to contact an outer circumference of the cooling tube 64 and an inner circumference of the outer tube 66. Thermoelectric elements are installed on an inner circumference of the cooling tube 64.

That is, the battery module 60 is formed in a dual-tube type. Therefore, an air channel through which cooling air can pass is defined between the cooling tube 64 and the outer tube 66.

Figure 3:
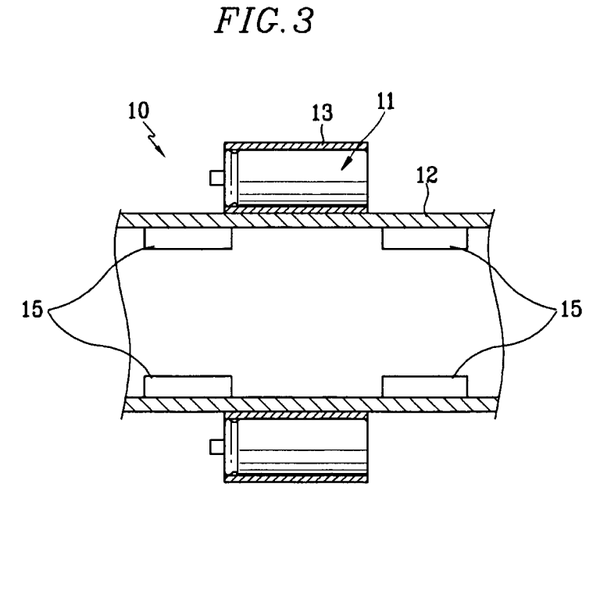
FIG. 3 is a sectional top view of the unit battery of FIG. 1.

Heat dissipation ribs 70 identical to those of FIGS. 3 and 4 may be formed on an outer circumference of the outer tube 66.

Figure 12:
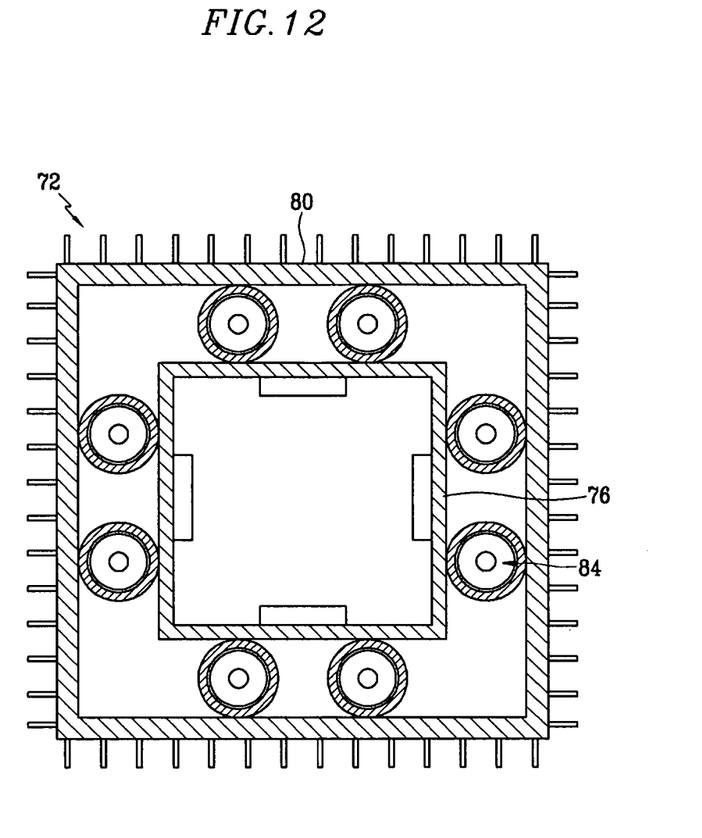
FIGS. 12 and 13 are side sectional views of modified examples of the battery module of FIG. 9.
Figure 13:
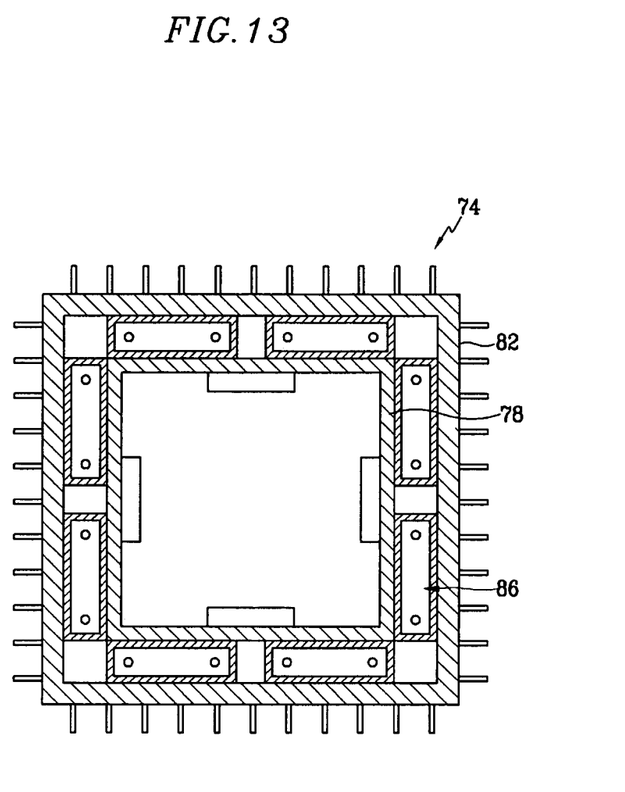

FIGS. 12 and 13 are modified examples of the battery module of FIG. 9.

Referring to FIG. 12, cooling and outer tubes 76 and 80 are formed having a rectangular section.

Referring to FIG. 13, cooling and outer tubes 78 and 82 are formed having a rectangular section and unit batteries 86 are prismatic batteries.

The operation of the battery modules of this embodiment will now be described with reference to FIG. 11.

The unit batteries 62 are uniformly cooled by the cooling air passing through the cooling tube 64 and the operation of the thermoelectric elements 65.

Here, since additional cooling air passes through the air channel defined between the cooling tube 64 and the outer tube 66, the cooling efficiency for the unit batteries is further enhanced. Furthermore, the heat dissipation ribs 70 formed on the outer circumference of the outer tube 66 quickly dissipate the heat discharged from the unit batteries 62 and transferred to the outer tube 66. Therefore, heat dissipation effect of the battery module 60 can be dramatically improved.

Figure 14:
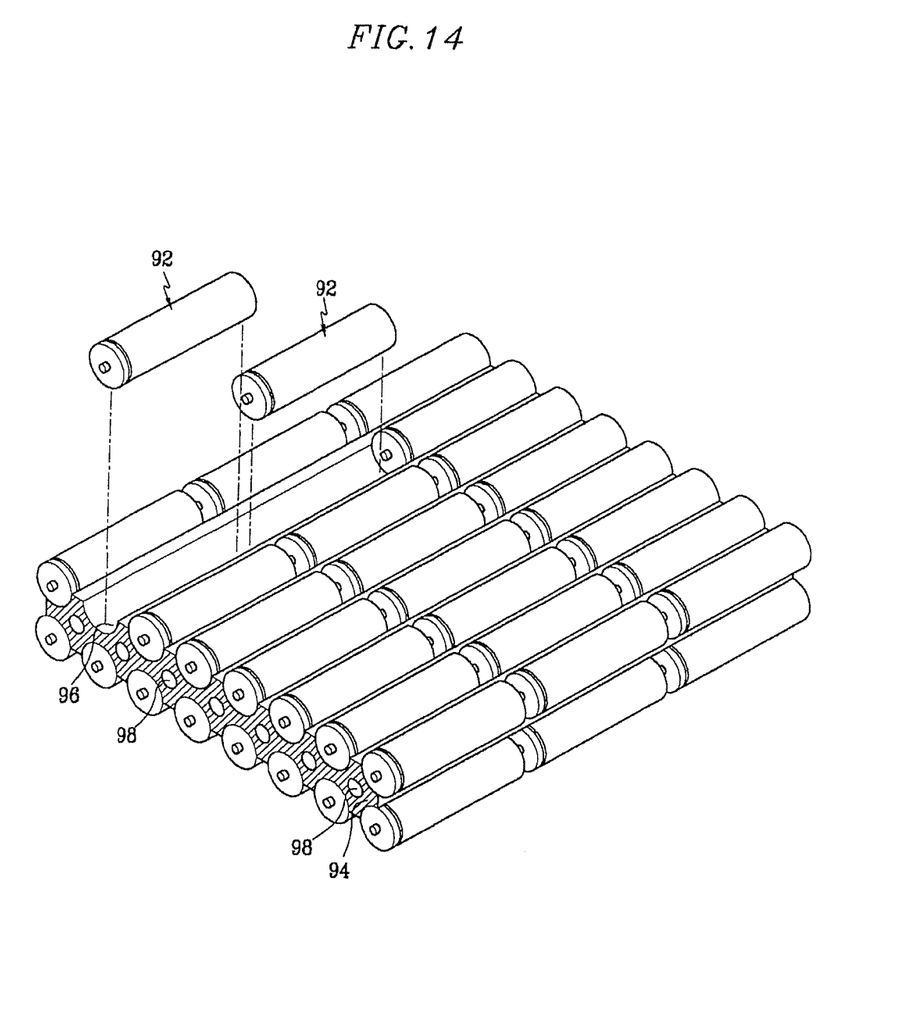
FIG. 14 is a perspective view of a battery module according to yet another exemplary embodiment of the present invention.
Figure 15:
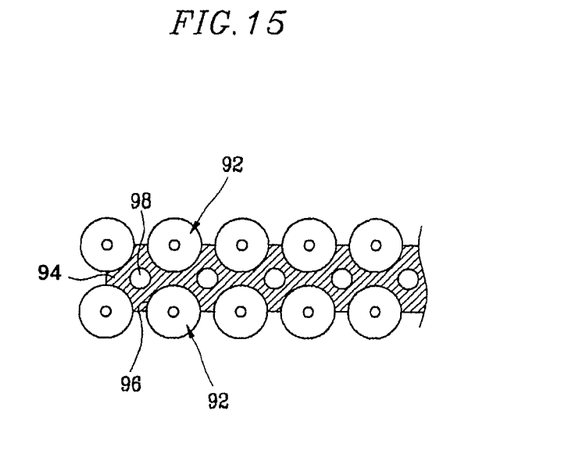
FIG. 15 is a front view of the battery module of FIG. 14.

FIGS. 14 and 15 show a battery module according to another embodiment of the present invention.

A battery module of this embodiment includes a plurality of unit batteries 92 arranged side-by-side and spaced away from each other by a predetermined distance.

The unit batteries 92 are cylindrical batteries.

That is, the unit batteries 92 are installed on a heat transferring body 94 and spaced apart from each other by a predetermined distance. The heat transferring body 94 functions to support the unit batteries 92 and to dissipate heat generated from the unit batteries 92.

The heat transferring body 94 is provided at an outer surface with a plurality of mounting grooves 96 for receiving the unit batteries 92. The heat transferring body 94 is further provided with a plurality of fluid passages 98 along which cooling water flows.

The heat transferring body 94 may be formed of aluminum or copper that is a high thermal conductive material. An insulation member (not shown) for breaking the current may be interposed between the unit batteries 92 and the heat transferring body 94.

The mounting grooves 96 each having a length greater than that of the unit battery 92 are consecutively formed on the heat transferring body 94 to allow two or more unit batteries 92 can be mounted on the single mounting groove 96.

FIG. 14 shows an example where three unit batteries 92 are mounted in the single mounting groove 96.

A size of the heat transferring body 94 is not limited to a specific size. That is, the number of unit batteries mounted on the heat transferring body 94 may increase or decrease according to the size of the heat transferring body 94.

The mounting grooves 96 are symmetrically formed on front and rear surfaces of the heat transferring body 94. The curvature of the mounting groove 96 is identical to or less than that of the outer circumference of the unit battery 92 so that the unit battery 92 can be forcedly fitted into the mounting groove 96.

At this point, a lateral section of the mounting groove 96 may be greater than a semi-circle. For example, the lateral section of the mounting groove 96 is two-third of the circle so that the unit battery 92 fitted in the mounting groove 96 cannot be easily removed from the mounting groove 96. That is, a depth of the mounting groove 96 is about two-third of the diameter of the unit battery 92.

The fluid passages 98 straightly penetrate the heat transferring body 94 between the mounting grooves 96. The fluid passage 98 has a circular section.

The fluid passage 98, however, is not limited to the above-described structure. Any structures that allows for the flow of a cooling medium will be applied to the present invention.

Figure 16:
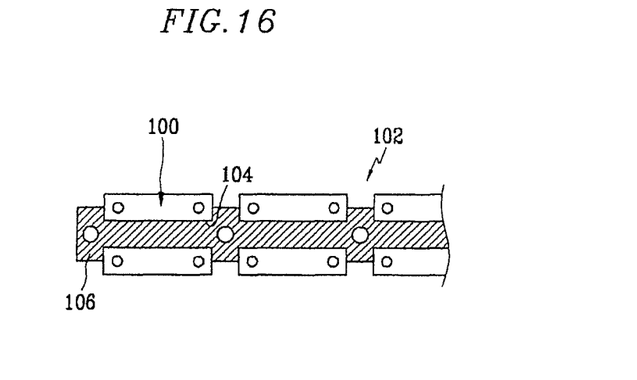
FIG. 16 is a front view of a modified example of the battery module of FIG. 14.

FIG. 16 shows a modified example of the battery module of FIG. 14.

In this modified example, unit batteries 100 are the prismatic batteries. The mounting grooves 104 are formed to correspond to the prismatic batteries 100.

The operation of the battery module according to the eighth embodiment will now be described.

The unit batteries 92 are supported on the heat transferring body 94 and the cooling water flows along the fluid passages 98 to dissipate the heat generated from the unit batteries 92.

At this point, since the unit batteries 92 uniformly contact the heat transferring body 94 and the fluid passages 98 are formed through the heat transferring body 94 and spaced away from each other by a predetermined distance, the unit batteries 92 uniformly heat-exchange with the cooling water under an identical condition.

That is, contact areas of the unit batteries 92 with the heat transferring body 94 are identical to each other and the cooling water uniformly flows through the heat transferring body 94, the unit batteries 92 can be uniformly cooled.

Therefore, an identical heat dissipation condition is applied for the unit batteries 92, thereby uniformly cooling the unit batteries 92.

As described above, according to this embodiment, by improving the arrangements of the fluid passages and the unit batteries, the unit batteries are more effectively cooled.

Furthermore, since the cooling medium uniformly flows between the unit batteries, a local thermal disequilibrium in the overall battery module can be prevented.

The battery modules according to the foregoing embodiments can be used as the power source for driving motors, such as those for hybrid electric vehicles, electric vehicles, electric scooters, electric bicycles, wireless vacuum cleaners, or the like.

Although exemplary embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A battery module comprising:
   a cooling tube comprising a perimeter wall defining a central channel for passing a cooling medium therethrough;
   a plurality of unit batteries in the central channel, the unit batteries mounted to the cooling tube and spaced apart from one another on the perimeter wall of the cooling tube, a first side of each of the unit batteries being coupled to the perimeter wall and remaining sides of the respective unit battery being adjacent the central channel; and
   a plurality of temperature adjusting units on the cooling tube and spaced apart from one another on the perimeter wall of the cooling tube for adjusting a temperature of the unit batteries.

2. The battery module of claim 1, wherein the plurality of temperature adjusting units comprises a plurality of thermoelectric elements.

3. The battery module of claim 1, wherein the unit batteries are mounted to an inner surface of the perimeter wall and the temperature adjusting units are on an outer surface of the perimeter wall.

4. The battery module of claim 1, wherein the unit batteries are mounted to an outer surface of the cooling tube and the temperature adjusting units are on an inner surface of the cooling tube.

5. The battery module of claim 1, wherein the cooling tube is cylindrical.

6. The battery module of claim 1, wherein the cooling tube is prismatic.

7. The battery module of claim 1, wherein the unit batteries are cylindrical.

8. The battery module of claim 1, wherein the unit batteries are prismatic.

9. The battery module of claim 1, wherein the unit batteries are inserted in respective ones of a plurality of insertion cases on an outer surface of the cooling tube.

10. The battery module of claim 9, wherein the insertion cases have sections corresponding to sections of the respective unit batteries.

11. The battery module of claim 1, wherein the cooling tube comprises aluminum.

12. The battery module of claim 1, wherein the plurality of temperature adjusting units comprises a plurality of heat dissipation ribs.

13. The battery module of claim 12, wherein the unit batteries are arranged on an inner surface of the perimeter wall and the heat dissipation ribs are on an outer surface of the perimeter wall.

14. The battery module of claim 12, wherein the unit batteries are arranged on an outer surface of the cooling tube and the heat dissipation ribs are on an inner surface of the cooling tube.

15. A battery module comprising:
   a cooling tube through which cooling air can pass;
   a unit battery mounted to the cooling tube;
   a plurality of temperature adjusting units spaced apart from one another along a perimeter of the cooling tube for adjusting a temperature of the unit battery; and
   an outer tube surrounding the cooling tube and together with the cooling tube defining a channel through which cooling air can pass between the outer tube and the cooling tube,
   wherein the unit battery is mounted in the channel between the outer tube and the cooling tube.

16. The battery module of claim 15, further comprising a heat dissipation rib on the outer tube.

17. The battery module of claim 15, wherein the outer tube is formed in a same shape as that of the cooling tube.

18. The battery module of claim 15, wherein an insertion case contacts an inner surface of the outer tube.

19. A battery module comprising:

a heat transferring body having a plurality of fluid passages penetrating through the heat transferring body in a flow direction for flowing a cooling medium therethrough in the flow direction and a plurality of mounting grooves on at least one outer surface of the heat transferring body, the at least one outer surface extending in the flow direction; and a plurality of unit batteries mounted in the mounting grooves and spaced apart from the fluid passages and the cooling medium with a portion of the unit battery protruding outside the heat transferring body from the at least one outer surface.

20. The battery module of claim 19, wherein the unit batteries are arranged on opposite surfaces of the heat transferring body.

21. The battery module of claim 19, wherein the cooling medium is cooling water.

22. The battery module of claim 19, wherein a depth of a mounting groove of the plurality of mounting grooves is about two-thirds of a diameter of a unit battery of the plurality of unit batteries that is mounted in the mounting groove.

23. The battery module of claim 19, wherein a curvature of a mounting groove of the plurality of mounting grooves is less than or equal to that of an outer circumference of a unit battery of the plurality of unit batteries that is mounted in the mounting groove.

* * * * *